US 9,075,972 B2

(12) United States Patent
Maeda et al.

(10) Patent No.: US 9,075,972 B2
(45) Date of Patent: Jul. 7, 2015

(54) IMAGE FORMING APPARATUS

(71) Applicant: KYOCERA Document Solutions Inc., Osaka-shi, Osaka (JP)

(72) Inventors: Tetsuya Maeda, Osaka (JP); Yasuhiro Fukui, Osaka (JP); Wataru Tsukuda, Osaka (JP)

(73) Assignee: KYOCERA Document Solutions Inc. (JP)

( * ) Notice: Subject to any disclaimer, the term of this patent is extended or adjusted under 35 U.S.C. 154(b) by 104 days.

(21) Appl. No.: 13/922,547

(22) Filed: Jun. 20, 2013

(65) Prior Publication Data

US 2013/0347098 A1 Dec. 26, 2013

(30) Foreign Application Priority Data

Jun. 26, 2012 (JP) ................................. 2012-143208

(51) Int. Cl.
*G06F 21/31* (2013.01)
*G06F 21/84* (2013.01)

(52) U.S. Cl.
CPC ................ *G06F 21/31* (2013.01); *G06F 21/84* (2013.01); *G06F 2221/2149* (2013.01)

(58) Field of Classification Search
CPC .. G06F 21/31; G06F 21/84; G06F 2221/2149
USPC ........................ 726/2, 16, 17, 21, 34; 358/1.1
See application file for complete search history.

(56) References Cited

U.S. PATENT DOCUMENTS

| 7,979,892 | B2* | 7/2011 | Mizumukai ........................ 726/2 |
| 8,505,089 | B2* | 8/2013 | Maeda et al. .................... 726/17 |
| 2005/0160297 | A1* | 7/2005 | Ogawa ........................... 713/202 |
| 2007/0079363 | A1* | 4/2007 | Itoh .................................. 726/5 |
| 2007/0136293 | A1* | 6/2007 | Mizumukai ........................ 707/9 |
| 2008/0059962 | A1* | 3/2008 | Ito ................................. 718/100 |
| 2009/0024531 | A1* | 1/2009 | Yamahata et al. .............. 705/55 |
| 2009/0100515 | A1* | 4/2009 | Masui ............................ 726/16 |

(Continued)

FOREIGN PATENT DOCUMENTS

| JP | 2003-244354 | 8/2003 |
| JP | 2005-86561 | 3/2005 |

(Continued)

OTHER PUBLICATIONS

Office Action Issued in Japanese Patent Application No. 2012-143208—Jul. 8, 2014.

*Primary Examiner* — Joseph P Hirl
*Assistant Examiner* — J. Brant Murphy
(74) *Attorney, Agent, or Firm* — Gerald E. Hespos; Michael J. Porco; Matthew T. Hespos

(57) ABSTRACT

An image forming apparatus includes a control unit, a login information storage, a login information receiver, a login authenticator, a target function setter, an authorization information storage, an alternative function information storage and a target function changer. The target function changer sets a user alternative function matching a user authorized function related to an authenticated user as a target function out of functions alternative to a user prohibited function and determined by alternative function information instead of the user prohibited function different from the user authorized function related to the authenticated user out of target functions when the authenticated user is set in a login state.

4 Claims, 9 Drawing Sheets

(56) References Cited

U.S. PATENT DOCUMENTS

| | | | |
|---|---|---|---|
| 2009/0112791 A1* | 4/2009 | Nakagoshi | 707/1 |
| 2009/0296150 A1* | 12/2009 | Shudo | 358/1.15 |
| 2010/0115608 A1* | 5/2010 | Uchikawa | 726/18 |
| 2010/0235888 A1* | 9/2010 | Miyamoto | 726/4 |
| 2010/0238481 A1* | 9/2010 | Homma | 358/1.14 |
| 2011/0078339 A1* | 3/2011 | Yamada | 710/14 |
| 2012/0030605 A1* | 2/2012 | Nakanishi | 715/773 |
| 2012/0092710 A1* | 4/2012 | Maeda et al. | 358/1.15 |
| 2012/0192257 A1* | 7/2012 | Ishii | 726/7 |
| 2012/0260333 A1* | 10/2012 | Uchikawa | 726/17 |

FOREIGN PATENT DOCUMENTS

| | | |
|---|---|---|
| JP | 2006-344128 | 12/2006 |
| JP | 2007-97024 | 4/2007 |
| JP | 2008-296381 | 12/2008 |

\* cited by examiner

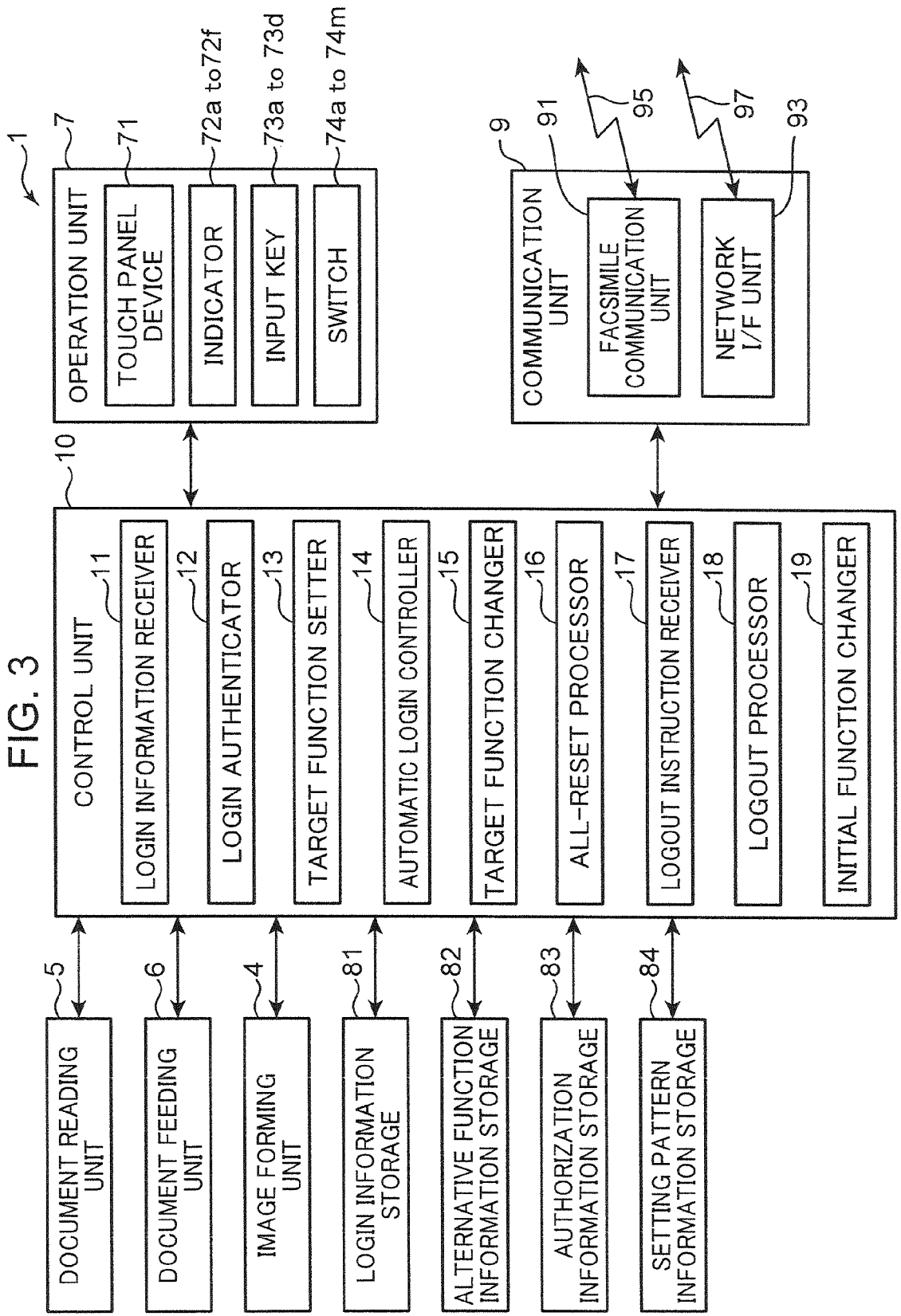

FIG. 4

| FUNCTION CATEGORY | FUNCTION | INITIAL STATE | USER NAME user01 | USER NAME user02 | ... | INITIALLY SET FUNCTION |
|---|---|---|---|---|---|---|
| COLOR | COLOR FUNCTION | | PERMITTED | PERMITTED | ... | ○ |
| | BLACK-AND-WHITE FUNCTION | PERMITTED | PERMITTED | | ... | |
| PRINT | DOUBLE-SIDED PRINT FUNCTION | PERMITTED | PERMITTED | PERMITTED | ... | ○ |
| | SINGLE-SIDED PRINT FUNCTION | | | PERMITTED | ... | |
| MAGNIFICATION | AUTOMATIC MAGNIFICATION FUNCTION | PERMITTED | PERMITTED | PERMITTED | ... | ○ |
| | FIXED MAGNIFICATION FUNCTION | PERMITTED | PERMITTED | PERMITTED | ... | |
| AGGREGATE | 2-in-1 AGGREGATE FUNCTION | PERMITTED | PERMITTED | PERMITTED | ... | |
| | AGGREGATE OFF FUNCTION | PERMITTED | | | ... | ○ |
| COLOR BALANCE | COLOR BALANCE ADJUSTMENT FUNCTION | | | PERMITTED | ... | |
| | COLOR BALANCE ADJUSTMENT OFF FUNCTION | PERMITTED | PERMITTED | PERMITTED | ... | ○ |
| HUE ADJUSTMENT | HUE ADJUSTMENT FUNCTION | | | PERMITTED | ... | |
| | HUE ADJUSTMENT OFF FUNCTION | PERMITTED | PERMITTED | PERMITTED | ... | ○ |

ALTERNATIVE FUNCTION INFORMATION EF

INITIAL AUTHORIZATION INFORMATION DF

USER AUTHORIZATION INFORMATION UF

FIG. 7

| FUNCTION DESIGNATED EARLIER \ FUNCTION DESIGNATED LATER | COLOR BALANCE ADJUSTMENT OFF FUNCTION | COLOR BALANCE ADJUSTMENT FUNCTION | HUE ADJUSTMENT OFF FUNCTION | HUE ADJUSTMENT FUNCTION | COLOR FUNCTION | BLACK-AND-WHITE FUNCTION (AF1) | AGGREGATE OFF FUNCTION | 2-in-1 AGGREGATE FUNCTION (AF2) | AUTOMATIC MAGNIFICATION FUNCTION | FIXED MAGNIFICATION FUNCTION |
|---|---|---|---|---|---|---|---|---|---|---|
| COLOR BALANCE ADJUSTMENT OFF FUNCTION | | P3 | P2 | P2 | P2 | P2 | P2 | P2 | P2 | P2 |
| COLOR BALANCE ADJUSTMENT FUNCTION | P3 | | P2 | P2 | P2 | P2 | P2 | P2 | P2 | P2 |
| HUE ADJUSTMENT OFF FUNCTION | P2 | P2 | | P3 | P2 | P2 | P2 | P2 | P2 | P2 |
| HUE ADJUSTMENT FUNCTION | P2 | P2 | P3 | | P2 | P3 | P2 | P2 | P2 | P2 |
| COLOR FUNCTION | P2 | P2 | P2 | P2 | | P3 | P2 | P2 | P2 | P2 |
| BLACK-AND-WHITE FUNCTION | P2 | P2 | P2 | P2 | P3 | | P2 | P2 | P2 | P2 |
| AGGREGATE OFF FUNCTION | P2 | P2 | P2 | P2 | P2 | P2 | | P3 | P2 | P2 |
| 2-in-1 AGGREGATE FUNCTION | P2 | P2 | P2 | P2 | P2 | P2 | P3 | | P2 | P3 |
| AUTOMATIC MAGNIFICATION FUNCTION | P2 | P2 | P2 | P2 | P2 | P2 | P2 | P2 | | P3 |
| FIXED MAGNIFICATION FUNCTION | P2 | P2 | P2 | P1 | P2 | P2 | P2 | P3 | P3 | |

SETTING PATTERN INFORMATION SP

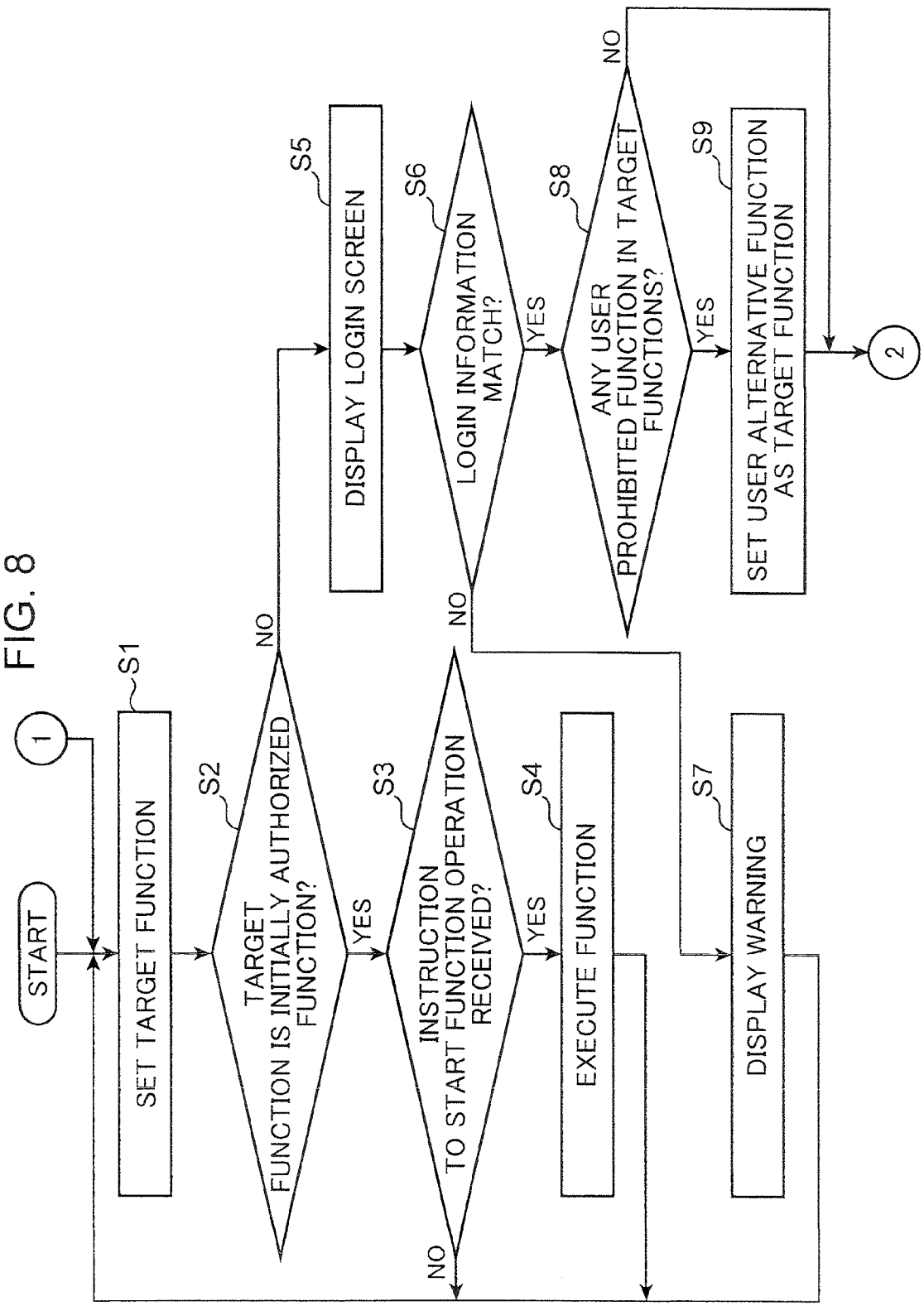

IMAGE FORMING APPARATUS

This application is based on Japanese Patent Application Serial No. 2012-143208 filed with the Japan Patent Office on Jun. 26, 2012, the contents of which are hereby incorporated by reference.

BACKGROUND

The present disclosure relates to an image forming apparatus, particularly to a technology for setting a function to be executed in an image forming apparatus.

Conventionally, a technology is, for example, known which registers functions permitted to be executed by each user in advance for each user registered in advance in an image forming apparatus. A technology is known which, when a user is authenticated to be an already registered user, for example, through the input of a user name and a password, sets a state where only functions, the execution of which is permitted for this user, are executable.

A technology is also known which permits or denies the execution of each function based on public registration information predetermined as to whether or not to permit the execution of each function for a public user whose user name and password are not input and who is not authenticated. According to this technology, it is possible to avoid the trouble of setting an authority to permit or deny the execution of each function as described above for all registered users.

However, in the above technology, if a public user performs user authentication after performing a setting operation to execute double-sided printing, for example, when it is determined by the public registration information to permit the execution of single-sided printing, but to deny the execution of double-sided printing for a public user, the execution of single-sided printing may be permitted, but the execution of double-sided printing may not be permitted in advance for this authenticated user. In this case, this authenticated user has to take the trouble to cancel the setting to execute double-sided printing and perform a setting operation to execute single-sided printing, the execution of which is permitted for the authenticated user, again.

In this way, when the execution of the function set as a function to be executed in an initial state is not permitted to be executed by a user authenticated thereafter, the authenticated user has to take the trouble to set an alternative function permitted to be executed as a function to be executed again.

An object of the present disclosure is to reduce the trouble for a user to change function setting if, when a certain user is authenticated in an initial state where there is no authenticated user, a function executable in an initial state is a function, the execution of which is not permitted for this authenticated user.

SUMMARY

An image forming apparatus according to one aspect of the present disclosure includes a control unit, a login information storage, a login information receiver, a login authenticator, a target function setter, an authentication information storage, an alternative function information storage and a target function changer.

The control unit is capable of executing a plurality of functions. The login information storage stores a plurality of pieces of login information for authenticating each of a plurality of authenticated users permitted in advance to use the image forming apparatus. The login information receiver receives the input of the login information. The login authenticator sets the authenticated user corresponding to the login information in a login state when the login information received by the login information receiver matches the login information stored in the login information storage. The target function setter receives the function designated by the user as the function to be executed by the control unit out of the plurality of functions and sets the received function as a target function. The authorization information storage stores in advance initial authorization information indicating initially authorized functions permitted to be executed by the users when the image forming apparatus is in an initial state where there is no authenticated user set in the login state and user authorization information relating user authorized functions permitted to be executed by each authenticated user to each authenticated user. The alternative function information storage stores in advance alternative function information determining combinations of mutually alternative functions out of the plurality of functions. The target function changer performs a target function changing process for setting a user alternative function matching the user authorized function related to the authenticated user set in the login state by the user authorization information as the target function out of the functions alternative to a user prohibited function and determined by the alternative function information instead of the user prohibited function different from the user authorized function related to the authenticated user set in the login state by the user authorization information out of the target functions set by the target function setter when the authenticated user is set in the login state by the login authenticator.

These and other objects, features and advantages of the present disclosure will become more apparent upon reading the following detailed description along with the accompanying drawings.

BRIEF DESCRIPTION OF THE DRAWINGS

FIG. 3 is a block diagram showing the electrical configuration of the multifunction peripheral, FIG. 4 is a table showing an example of information stored in an alternative function information storage and an authorization information storage, FIG. 7 is a table showing an example of setting pattern information stored in a setting pattern information storage, FIG. 8 is a flow chart showing the operation of the target function changing process.

DETAILED DESCRIPTION

Figure 1:
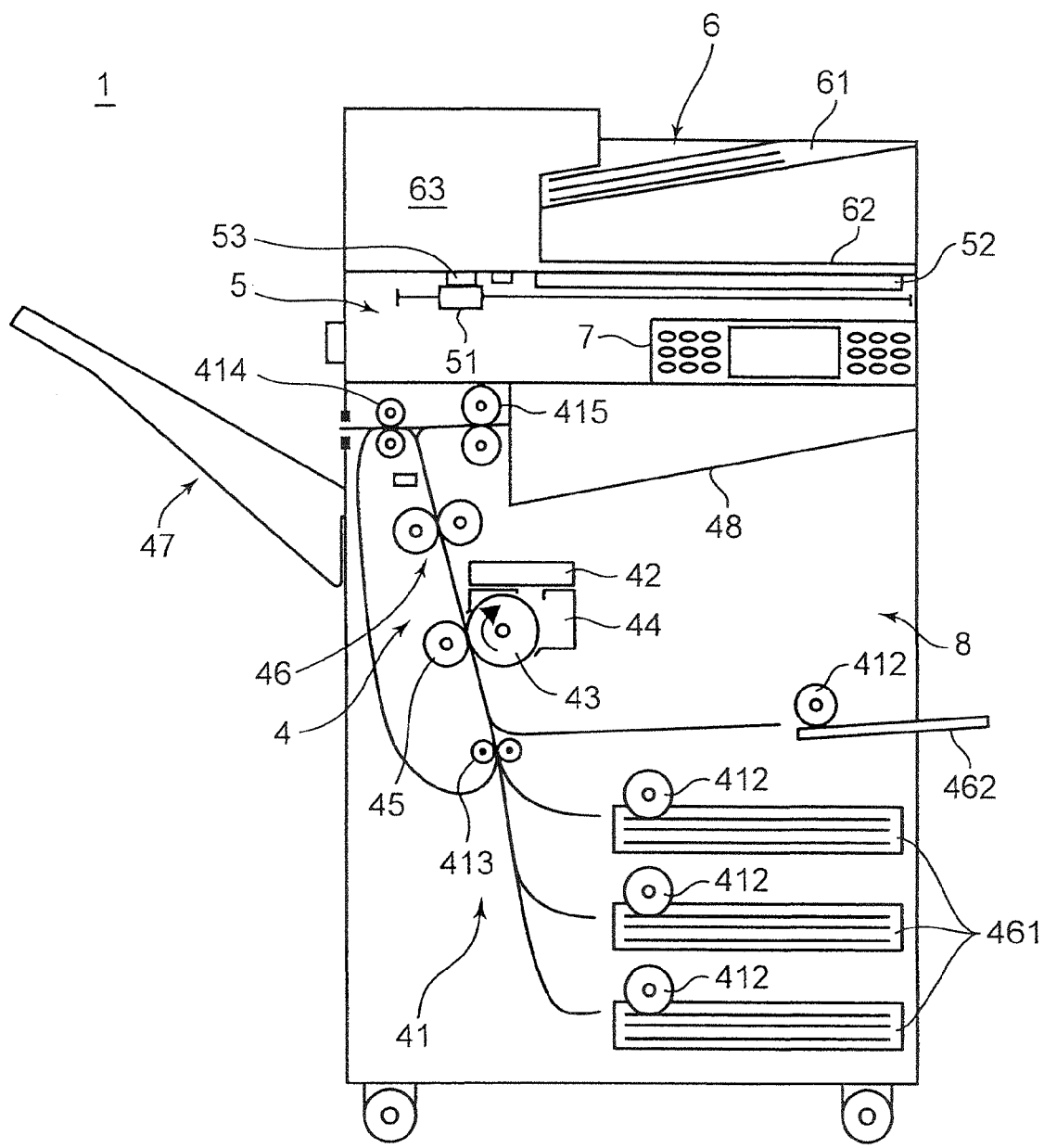
FIG. 1 is a schematic configuration diagram of a multifunction peripheral according to one embodiment of an image forming apparatus according to the present disclosure.

Hereinafter, an embodiment according to the present disclosure is described based on the drawings. FIG. 1 is a schematic configuration diagram of a multifunction peripheral 1 according to one embodiment of an image forming apparatus according to the present disclosure.

As shown in FIG. 1, the multifunction peripheral 1 includes a document reading unit 5, a document feeding unit 6, a main body unit 8 and an operation unit 7.

The document reading unit 5 is arranged atop the main body unit 8 and includes a scanner unit 51 composed of an exposure lamp, a CCD (Charge Coupled Device) and the like, a document platen 52 made of a transparent material such as glass and a document reading slit 53.

The scanning unit 51 is configured to be moved by an unillustrated driving unit. When reading a document placed on the document platen 52, the scanner unit 51 moves along a document surface at a position facing the document platen 52 and outputs obtained image data to a control unit 10 to be described later while scanning a document image. Further, when reading a document fed by the document feeding unit 6, the scanner unit 51 moves to a position facing the document reading slit 53. Then, the scanner unit 51 obtains an image of the document via the document reading slit 53 in synchronization with a document conveying operation by the document feeding unit 6 and outputs the obtained image data to the control unit 10 to be described later.

The document feeding unit 6 is arranged atop the document reading unit 5. The document feeding unit 6 includes a document placing portion 61 on which documents are to be placed, a document discharging portion 62 to which documents having images thereof already read are to be discharged, and a document conveying mechanism 63. The document conveying mechanism 63 picks up documents placed on the document placing portion 61 one by one, conveys them to a position facing the document reading slit 53 and discharges them to the document discharging portion 62.

The main body unit 8 includes a plurality of sheet cassettes 461, feed rollers 412, an image forming unit 4, a stack tray 47 and a discharge tray 48. The feed roller 412 picks up sheets one by one from the sheet cassette 461 or a manual feed tray 462 and conveys them to the image forming unit 4. The image forming unit 4 forms an image on a sheet conveyed thereto. Sheets having an image formed thereon are discharged to the stack tray 47 and the discharge tray 48.

The image forming unit 4 includes a sheet conveying unit 41, an optical scanning device 42, a photoconductive drum 43, a developing unit 44, a transfer unit 45 and a fixing unit 46.

The sheet conveying unit 41 is provided in a sheet conveyance path in the image forming unit 4. The sheet conveying unit 41 includes conveyor rollers 413, 414, 415 and the like. The conveyor rollers 413 feed a sheet conveyed thereto by the feed roller 412 to the photoconductive drum 43. The conveyor rollers 414 convey a sheet to the stack tray 47. The conveyor rollers 415 convey a sheet to the discharge tray 48.

The optical scanning device 42 outputs laser light based on image data input to the control unit 10. The optical scanning device 42 scans the photoconductive drum 43 with the output laser light. In this way, the optical scanning device 42 forms an electrostatic latent image on the photoconductive drum 43.

The developing unit 44 forms a toner image by attaching toner to an electrostatic latent image on the photoconductive drum 43. The transfer unit 45 transfers a toner image on the photoconductive drum 43 to a sheet. The fixing unit 46 fixes a toner image to a sheet by heating the sheet having the toner image transferred thereto.

Figure 2:
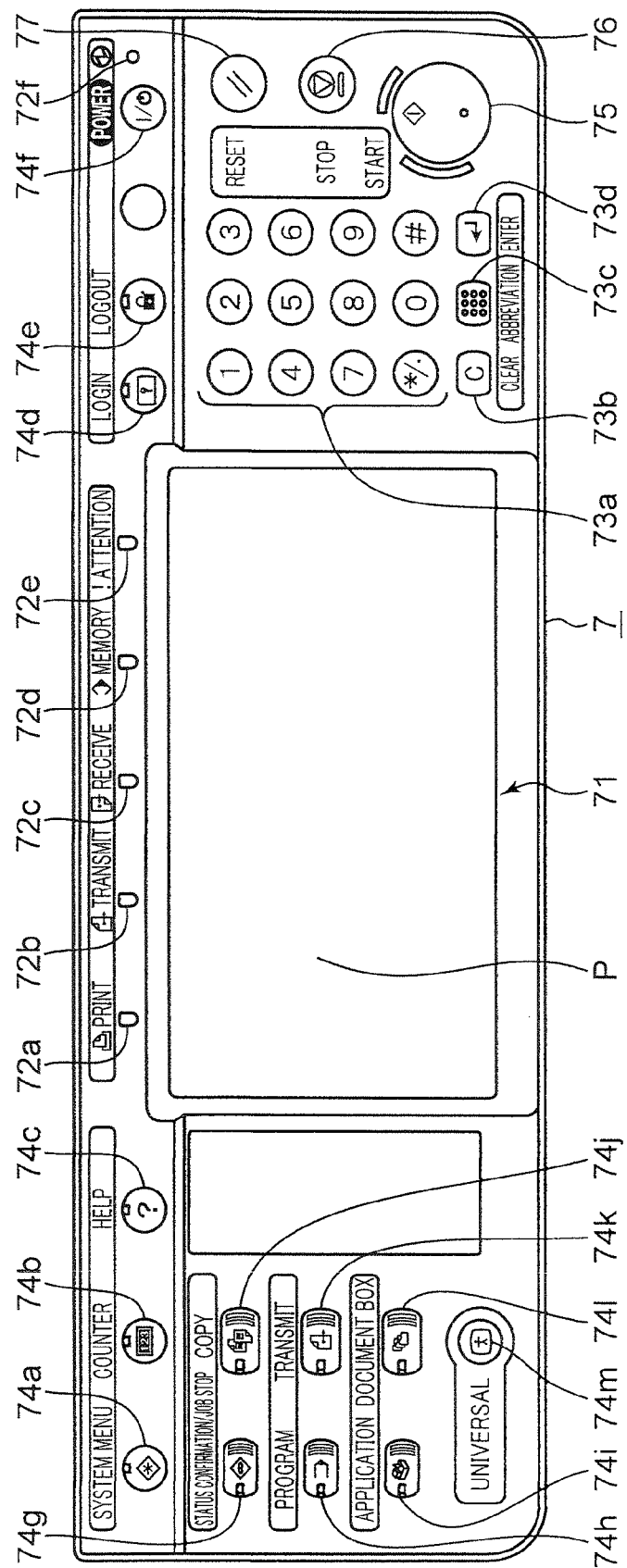
FIG. 2 is a diagram showing an example of an operation unit.

The operation unit 7 is provided on a front surface portion of the multifunction peripheral 1 and various operation instructions by a user can be input thereto. FIG. 2 is a diagram showing an example of the operation unit 7. As shown in FIG. 2, the operation unit 7 includes a touch panel device 71, indicators 72a to 72f, input keys 73a to 73d, switches 74a to 74m, a start key 75, a stop key 76 and a reset key 77.

The touch panel device (display unit) 71 includes a liquid crystal display P having a touch panel function. By the touch panel function, the touch panel device 71 receives an instruction given by depressing a soft key when the soft key displayed on the liquid crystal display P is touched by the user. Further, by the touch panel function, the touch panel device 71 receives a trace of a position touched by the user on the liquid crystal display P as an instruction given by a gesture operation. The instruction by the gesture operation is received by the control unit 10 to be described later based on the information of the trace received by the touch panel device 71.

For example, instructions given by gesture operations such as a tap operation, a pinch operation, a swipe operation and a flick operation are input to the touch panel device 71. The tap operation is an operation of gently striking the liquid crystal display P. The pinch operation is an operation of pinching the liquid crystal display P with two fingers or moving the two fingers apart in a pinching state. The swipe operation is an operation of sliding a finger held in contact with the liquid crystal display P. The flick operation is an operation of moving a finger to flick the liquid crystal display P.

The indicators 72a to 72f are formed of light emitting diodes or the like. The indicators 72a to 72f indicate a state of the multifunction peripheral 1 by blinking or turning on/off. For example, the indicator 72a blinks during printing. The indicator 72b blinks during the transmission of data to outside. The indicator 72c blinks during the reception of data from outside. The indicator 72d blinks during an access to data stored in a hard disk, a memory or the like provided in the multifunction peripheral 1. The indicator 72e turns on or blinks in the event of an abnormality. The indicator 72f turns on when the multifunction peripheral 1 is powered on.

The input keys 73a to 73d are provided to input numbers and symbols, delete or confirm an already input character string. For example, the input keys 73a are a so-called numerical key group and provided to input numbers and symbols. The input key 73b is a so-called clear key and provided to delete an already input character string. The input key 73c is a so-called abbreviation key and provided to read and input a character string stored in advance in the memory or the like. The input key 73d is a so-called enter key (return key) and provided to confirm an instruction to input a character string, an instruction to select a soft key and the like.

The switches 74a to 74m are switches for switching each function provided in the multifunction peripheral 1. For example, as a representative one, the switch 74a is a switch for switching a function to be executed to a system menu function for initial setting relating to the overall operation of the multifunction peripheral 1. When the switch 74a is depressed, an operation screen for allowing an operation of setting initial set values of the respective functions is displayed on the liquid crystal display P. Hereinafter, the switch 74a is referred to as a system menu button 74a.

The switch 74j is a switch for switching the function to be executed to a copy function for printing using image data read by the scanner unit 51. When the switch 74j is depressed, an operation screen for allowing a setting operation relating to the copy function is displayed on the liquid crystal display P.

The switch 74d is a switch for switching the function to be executed to a login authentication function for authenticating an authenticated user who is a user permitted in advance to use the multifunction peripheral 1. When the switch 74d is depressed, a login screen is displayed on the liquid crystal display P. The login screen is an operation screen for allowing an operation of entering login information for the authentication of an authenticated user. Hereinafter, the switch 74*d* is referred to as a login instruction button 74*d*.

The switch 74*e* is a switch for switching the function to be executed to a logout function for canceling a login state of an authenticated user who is in the login state and changing the state of the multifunction peripheral 1 to an initial state. The initial state means a state where there is no authenticated user set in the login state. Hereinafter, the switch 74*e* is referred to as a logout instruction button 74*e*.

The start key 75 is provided to start the operation of each function. The stop key 76 is provided to stop the operation of each function. The reset key 77 is provided to return the function to be executed to a predetermined initially set function to be described later.

FIG. 3 is a block diagram showing the electrical configuration of the multifunction peripheral 1. In the multifunction peripheral 1, units such as the document reading unit 5, the document feeding unit 6, the image forming unit 4, the operation unit 7, a communication unit 9, four storages 81 to 84 and the control unit 10 are connected to be able to communicate with each other. Components denoted by the same reference signs as in FIGS. 1 and 2 are not described unless particularly noted otherwise.

The communication unit 9 includes a facsimile communication unit 91 and a network I/F unit 93. The facsimile communication unit 91 is connected to a telephone line 95. The facsimile communication unit 91 includes an NCU (Network Control Unit) for controlling the connection of the telephone line to a destination facsimile machine and a modulation/demodulation circuit for modulating and demodulating a signal for facsimile communication. The facsimile communication unit 91 transmits image data read by the document reading unit 5 to another facsimile machine and receives image data transmitted from another facsimile machine via the telephone line 95.

The network I/F unit 93 is connected to a LAN (Local Area Network) 97. The network I/F unit 93 is a communication interface circuit for carrying out a communication with terminal units such as personal computers connected to the LAN 97. The network I/F unit 93 transmits image data read by the document reading unit 5 to external computers such as personal computers and receives image data transmitted from external computers via the LAN 97.

The four storages 81 to 84 are configured, for example, by a storage medium such as a HDD (Hard Disk Drive) and classified according to the type of information to be stored.

A plurality of pieces of login information for the authentication of a plurality of authenticated users permitted in advance to use the multifunction peripheral 1 are stored in the login information storage 81. Each piece of login information includes, for example, a user name for identifying each authenticated user, a password to be entered when authenticating the authenticated user, and character string information such as the name of a department to which the user belongs.

FIG. 4 is a table showing an example of information stored in the alternative function information storage 82 and the authorization information storage 83. As shown in FIG. 4, alternative function information EF which determines combinations of mutually alternative functions out of a plurality of functions executable by the control unit 10 are stored in advance in the alternative function information storage 82.

Specifically, color, print, magnification, aggregate, color balance and hue adjustment are determined as function categories. Functions belonging to (corresponding to) each function category are determined as combinations of alternative functions.

For example, in the alternative function information EF shown in FIG. 4, the function category "color" includes a color function and a black-and-white function, which are a combination of alternative functions which cannot be executed simultaneously (in parallel). Similarly, in the alternative function information EF shown in FIG. 4, the function category "print" includes a double-sided print function and a single-sided print function and the function category "magnification" includes an automatic magnification function and a fixed magnification function.

Further, the function category "aggregate" includes a 2-in-1 aggregate function for aggregating two images into one image and an aggregate off function for not executing the 2-in-1 aggregate function, which are a combination of alternative functions which cannot be executed simultaneously. Similarly, the function category "color balance" includes a color balance adjustment function and a color balance adjustment off function for not executing the color balance adjustment function. Further, the function category "hue adjustment" includes a hue adjustment function and a hue adjustment off function for not executing the hue adjustment function.

Initial authorization information DF is stored in advance in the authorization information storage 83. The initial authorization information DF is information indicating initially authorized functions permitted to be executed by users when the multifunction peripheral 1 is in the initial state. In FIG. 4, the initial authorization information DF corresponds to an initial state column. The initially authorized functions correspond to functions written with "permitted" in the initial state column.

Specifically, in the initial authorization information DF shown in FIG. 4, the black-and-white function, the double-sided print function, the automatic magnification function, the fixed magnification function, the 2-in-1 aggregate function, the aggregate off function, the color balance adjustment off function and the hue adjustment off function are determined as the initially authorized functions. That is, when the multifunction peripheral 1 is in the initial state, a user can execute one or more of the eight initially authorized functions.

Note that if a plurality of initially authorized functions belong to one function category, those initially authorized functions constitute a combination of alternative functions which cannot be executed simultaneously in a state where an authenticated user is not logged in (initial state). For example, out of the above eight initially authorized functions, the automatic magnification function and the fixed magnification function belong to the same function category "magnification" in the alternative function information EF. Thus, when the multifunction peripheral 1 is in the initial state, the user can execute only either one of these functions. Similarly, when the multifunction peripheral 1 is in the initial state, the user can execute only either one of the 2-in-1 aggregate function and the aggregate off function belonging to the function category "aggregate" in the alternative function information EF.

Further, user authorization information UF relating user authorized functions permitted to be executed by each authenticated user to each authenticated user is stored in advance in the authorization information storage 83. In FIG. 4, the user authorized function UF corresponds to a user name column. The functions written with "permitted" in the user name column correspond to the user authorized functions.

For example, in the user authorization information UF shown in FIG. 4, the black-and-white function, the double-sided print function, the automatic magnification function, the fixed magnification function, the 2-in-1 aggregate function, the color balance adjustment off function and the hue adjustment off function are determined as user authorized functions corresponding to an authenticated user identified by a user name "user01". Further, the color function, the double-sided print function, the single-sided print function, the automatic magnification function, the fixed magnification function, the 2-in-1 aggregate function, the color balance adjustment function, the color balance adjustment off function, the hue adjustment function and the hue adjustment off function are determined as user authorized functions corresponding to an authenticated user identified by a user name "user02".

Setting pattern information to be described later is stored in advance in the setting pattern information storage 84.

The control unit 10 includes, for example, a CPU (Central Processing Unit) for performing predetermined arithmetic processings, memories such as a ROM (Read Only Memory) storing a predetermined control program and a RAM (Random Access Memory) for temporarily storing data, ASICs (Application Specific Integrated Circuits) which are dedicated hardware configured to enable predetermined processings such as an image processing to be performed at a high speed, and peripheral circuits and the like of these. The control unit 10 performs various processings and controls the operation of each component in the multifunction peripheral 1 by executing control programs stored in the ROM and the like by the CPU.

The control unit 10 configures a login information receiver 11, a login authenticator 12, a target function setter 13, an automatic login controller 14, a target function changer 15, an all-reset processor 16, a logout instruction receiver 17, a logout processor 18 and an initial function changer 19, particularly in this embodiment as processors for executing a plurality of functions.

The login information receiver 11 receives the input of login information. For example, when a user enters a user name and a password on a login screen displayed on the liquid crystal display P after the login instruction button 74*d* is depressed by the user, the login information receiver 11 receives the entered user name and password as login information.

The login authenticator 12 determines whether or not the login information received by the login information receiver 11 matches the login information stored in the login information storage 81. The login authenticator 12 sets an authenticated user corresponding to this login information in a login state if the login information is determined to match in the above determination. To set in the login state means, for example, to store the user name included in the login information of the authenticated user set in the login state in the RAM.

The target function setter 13 receives functions designated by the user, for example, through the operation of an operation screen displayed on the liquid crystal display P as functions to be executed by the control unit 10. The target function setter 13 sets the received functions as target functions. To set as a target function means, for example, to store information such as a function name for identifying this target function in the RAM.

The automatic login controller 14 causes the liquid crystal display P to display the login screen if set target functions differ from the initially authorized functions when the target functions are set by the target function setter 13 in the case where the multifunction peripheral 1 is in the initial state. By this, the automatic login controller 14 guides the input of the login information to the login information receiver 11.

The target function changer 15 executes a target function changing process when the authenticated user is set in the login state by the login authenticator 12.

Figure 5A:
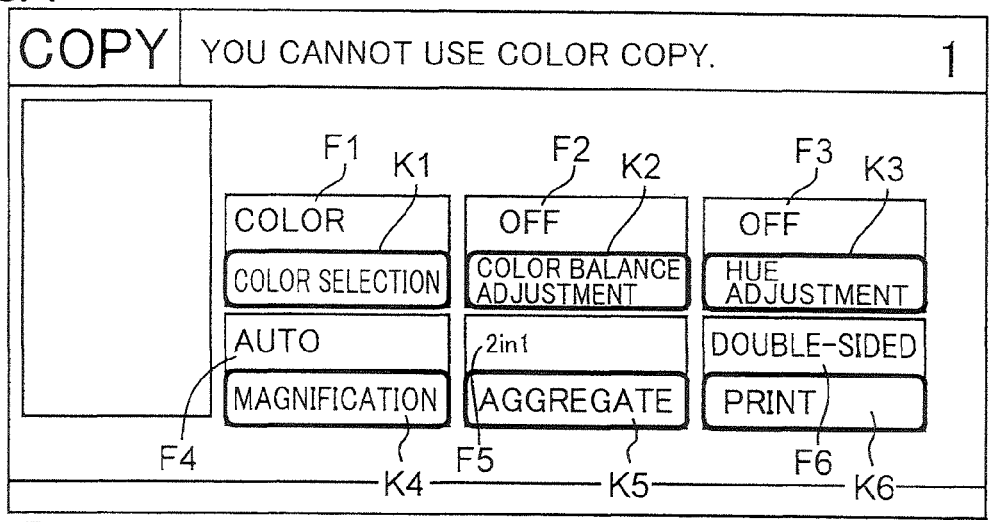
FIG. 5A is a diagram showing an operation screen for designating detailed functions relating to a copy function.
Figure 5B:
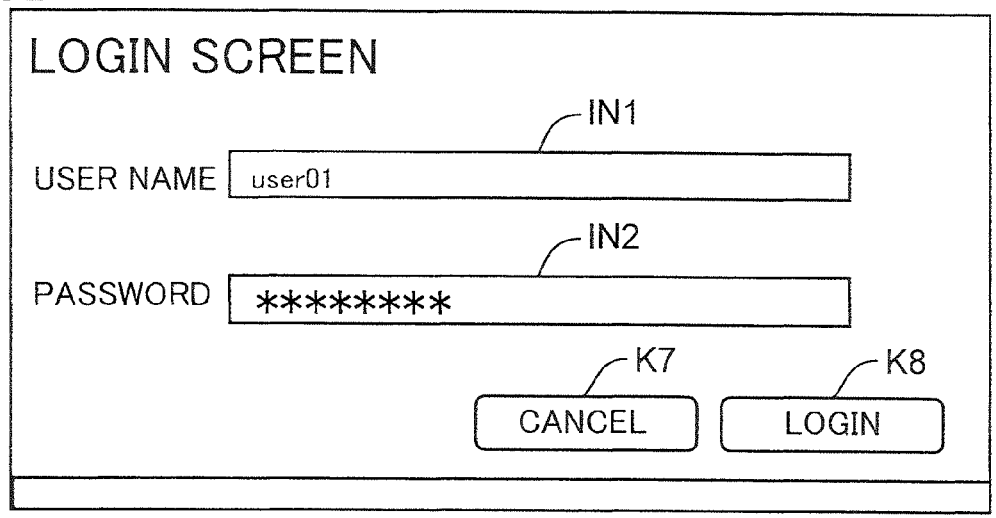
FIG. 5B is a diagram showing a login screen.
Figure 5C:
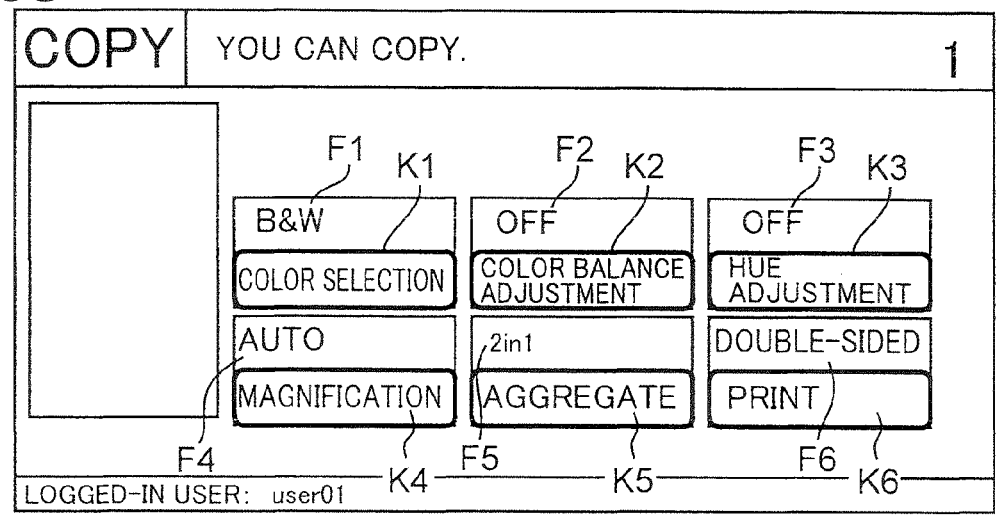
FIG. 5C is a diagram showing an operation screen for designating detailed functions relating to the copy function after a target function changing process.

FIG. 5A is a diagram showing an operation screen for designating detailed functions relating to the copy function. FIG. 5B is a diagram showing the login screen. FIG. 5C is a diagram showing an operation screen for designating the detailed functions relating to the copy function after the target function changing process. In FIGS. 5A and 5C, reference signs K1 to K6 denote soft keys for allowing the user to designate any function out of a plurality of alternative functions belonging to the function category. Reference signs F1 to F6 denote display fields for character string information indicating the function set as the target function out of the functions belonging to each function category corresponding to the soft keys K1 to K6.

Specifically, the operation screen shown in FIG. 5A shows a state where information "color" indicating the color function is shown in the display field F1 by the control unit 10 after the color function is designated by the user through the operation of the soft key K1 displayed with "color selection" corresponding to the function category "color" and the color function is set as the target function by the target function setter 13 when the multifunction peripheral 1 is in the initial state.

Similarly, the operation screen shown in FIG. 5A shows a state where the color balance adjustment off function, the hue adjustment off function, the automatic magnification function, the 2-in-1 aggregate function and the double-sided print function are set as the target functions and information indicating the target functions is shown in each of the display fields F2 to F6 by the operation of the soft keys K2 to K6 respectively corresponding to the function categories "color balance", "hue adjustment", "magnification", "aggregate" and "print".

For example, when the color function is set as the target function by the target function setter 13, the automatic login controller 14 determines whether or not the color function set as the target function is the initially authorized function using the initial authorization information DF (FIG. 4) stored in the authorization information storage 83. The automatic login controller 14 causes the liquid crystal display P to display the login screen, for example, as shown in FIG. 5B when the color function is determined to be a function different from the initially authorized function using the initial authorization information DF.

Note that, in FIG. 5B, reference sign IN1 denotes an entry field for user name and reference sign IN2 denotes an entry field for password. Further, a cancel button K7 is a button for performing an operation of hiding the login screen. A login button K8 is a button for performing an operation of causing the login information receiver 11 to receive the user name and the password entered in the entry fields IN1, IN2.

When the user name "user01" and the password are entered in the entry field IN1, IN2 and the login button K8 is depressed, the user name and the password entered in the entry fields IN1, IN2 are received by the login information receiver 11. If the entered user name and password match those stored in the login information storage 81, the authenticated user identified by the user name "user01" is set in the login state by the login authenticator 12.

When the authenticated user identified by the user name "user01" is set in the login state in this way, the target function changer 15 starts the execution of the target function changing process.

In the target function changing process, it is first determined whether or not the target functions set by the target function setter 13 include any user prohibited function using the user authorization information UF (FIG. 4) stored in the authorization information storage 83. The user prohibited function is a function different from the user authorized functions corresponding to the authenticated user in the login state. If the target functions set by the target function setter 13 include any user prohibited function, the target function changer 15 stores information identifying this user prohibited function in the RAM. The storage of the information identifying the function in the RAM is referred to as the storage of the function in the RAM below for the sake of convenience.

Specifically, the target function changer 15 determines that a color function different from the user authorized functions corresponding to the authenticated user identified by the user name "user01" is included in the color function, the color balance adjustment off function, the hue adjustment off function, the automatic magnification function, the 2-in-1 aggregate function and the double-sided print function set as the target functions as shown in FIG. 5A, using the user authorization information UF shown in FIG. 4. Accordingly, the target function changer 15 stores the color function as the user prohibited function in the RAM.

Next, the target function changer 15 sets a user alternative function as the target function instead of the user prohibited function, using the alternative function information EF (FIG. 4) stored in the alternative function information storage 82. The user alternative function is a function matching the user authorized function corresponding to the authenticated user set in the login state out of the functions alternative to the user prohibited function and determined by the alternative function information EF.

Specifically, the target function changer 15 sets the black-and-white function, which is the user authorized function corresponding to the authenticated user identified by the user name "user01", as the user alternative function out of the functions alternative to the color function that is the user prohibited function, using the alternative function information EF shown in FIG. 4, and sets this black-and-white function as the target function instead of the color function. In this way, the target function changer 15 finishes the target function changing process.

Note that when the target function changing process by the target function changer 15 is finished, the character string information corresponding to the black-and-white function set as the target function in the target function changing process is displayed in the display field F1 by the control unit 10, for example, as shown in FIG. 5C.

As just described, the target function changer 15 performs the target function changing process for setting the user alternative function, which is a function matching the user authorized function related to the authenticated user set in the login state by the user authorization information UF, as the target function out of the functions alternative to the user prohibited function and determined by the alternative function information EF instead of the user prohibited function, which is a function different from the user authorized function related to the authenticated user in the login state by the user authorization information UF, out of the target functions set by the target function setter 13 when the authenticated user is set in the login state by the login authenticator 12.

As shown in FIG. 3, the all-reset processor 16 performs an all-reset process, for example, when the reset key 77 is depressed, during a logout process to be described later or the like. The all-reset process is a process for setting predetermined one or more initially set functions as target functions instead of all the functions set as the target functions.

The initially set function is set, for example, through the operation of an operation screen displayed on the liquid crystal display P in a system menu function by the user.

For example, in FIG. 4, the initially set functions correspond to the functions marked with ○ in an initially set function column. In FIG. 4, the color function, the double-sided print function, the automatic magnification function, the aggregate off function, the color balance adjustment off function and the hue adjustment off function are set as the initially set functions.

The logout instruction receiver 17 receives a logout instruction to change the state of the multifunction peripheral 1 to the initial state, for example, when the logout instruction button 74e is depressed by the user. Note that, without being limited to this, the logout instruction receiver 17 may be configured to regularly receive a logout instruction at every predetermined time interval, e.g. every hour.

The logout processor 18 performs a logout process when a logout instruction is received by the logout instruction receiver 17 when any of the authenticated users is in the login state. The logout process is a process for changing the state of the multifunction peripheral 1 to the initial state by causing the all-reset processor 16 to perform the all-reset process and canceling the login state. Note that to cancel the login state means, for example, to delete information such as the user name of the authenticated user corresponding to the login state set in the RAM.

The initial function changer 19 performs an initial function changing process when the logout process is performed by the logout processor 18.

Figure 6A:
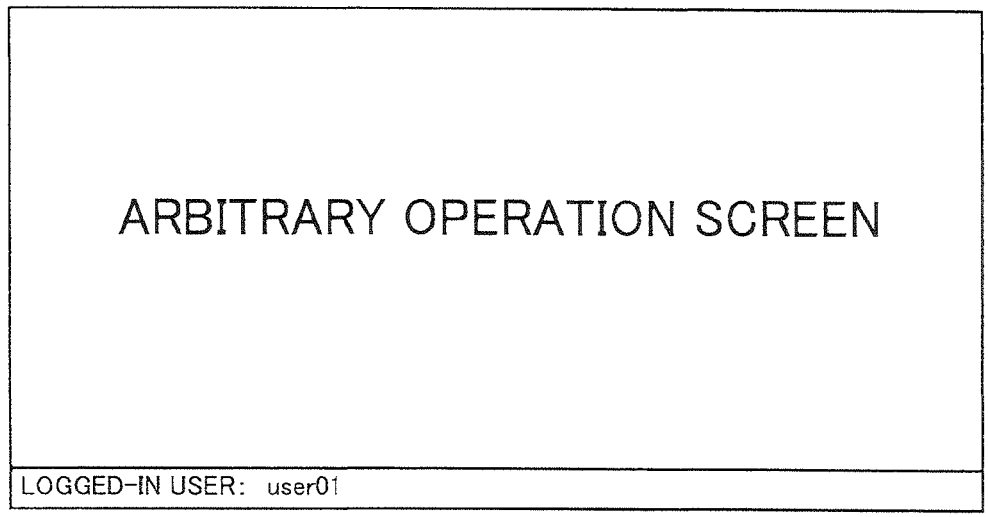
FIG. 6A is a diagram showing an arbitrary operation screen when an authenticated user identified by a user name "user01" is in a login state and FIG. 6B is a diagram showing an operation screen for designating detailed functions relating to the copy function after an initial function changing process.

For example, FIG. 6A shows an arbitrary operation screen when the authenticated user identified by the user name "user01" is in the login state. If the logout instruction button 74e (FIG. 2) is depressed and the logout instruction is received by the logout instruction receiver 17 in this case, the logout processor 18 performs the logout process.

When the logout process is performed, the color function, the double-sided print function, the automatic magnification function, the aggregate off function, the color balance adjustment off function and the hue adjustment off function set as the initially set functions shown in FIG. 4 are, for example, set as the target functions by the all-reset process by the all-reset processor 16 performed in the logout process. When the logout process is performed, the initial function changer 19 starts the execution of the initial function changing process.

In the initial function changing process, it is determined whether or not there is any initially prohibited function different from the initially authorized function in the initial set functions set as the target functions by the all-reset process, using the initial authorization information DF (FIG. 4) stored in the authorization information storage 83. If any initially prohibited function is included, the initial function changer 19 stores this initially prohibited function in the RAM.

Specifically, the initial function changer 19 determines that the color function different from the initially authorized function is included in the color function, the double-sided print function, the automatic magnification function, the aggregate off function, the color balance adjustment off function and the hue adjustment off function, which are the initially set functions set as the target functions by the all-reset process, using the initial authorization information DF shown in FIG. 4.

Then, the initial function changer 19 stores the color function as the initially prohibited function.

Subsequently, the initial function changer 19 sets an initial alternative function matching the initially authorized function out of the functions alternative to the initially prohibited function as the target function instead of this initially prohibited function, using the alternative function information EF (FIG. 4) stored in the alternative function information storage 82.

Specifically, the initial function changer 19 sets the black-and-white function, which is the initially authorized function, as the initial alternative function out of the functions alternative to the color function, which is the initially prohibited function, using the alternative function information EF show in FIG. 4 and sets this black-and-white function as the target function instead of the color function. In this way, the initial function changer 19 finishes the initial function changing process.

Figure 6B:
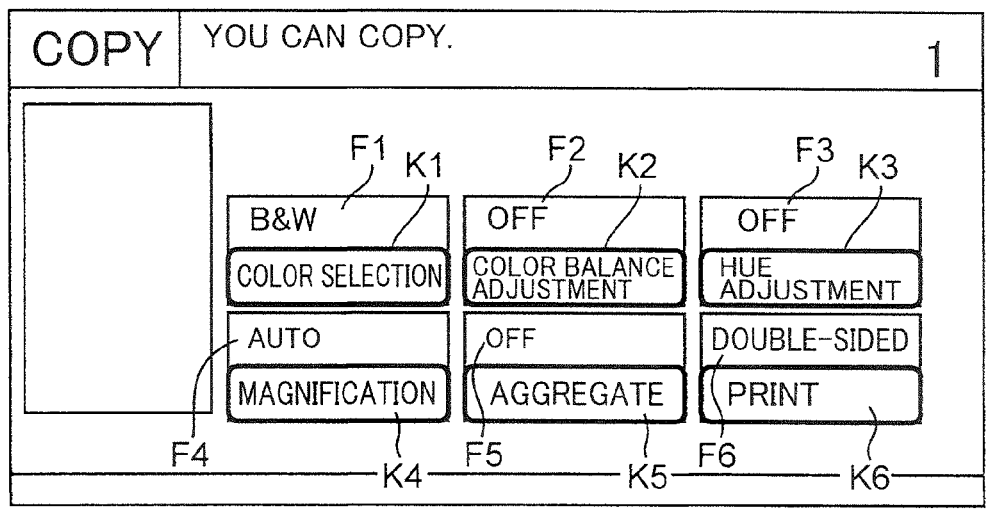

FIG. 6B shows an operation screen for designating detailed functions relating to the copy function after the initial function changing process. When the initial function changing process by the initial function changer 19 is finished, the character string information corresponding to the black-and-white function set as the target function by the initial function changing process is displayed in the display field F1 by the control unit 10, for example, as shown in FIG. 6B.

As just described, the initial function changer 19 performs the initial function changing process for setting the initial alternative function matching the initially authorized function as the target function out of the functions alternative to the initially prohibited function and determined by the alternative function information EF instead of the initially prohibited function different from the initially authorized function out of the initially set functions set as the target functions by the all-reset process when the logout process is performed by the logout processor 18.

Note that, when there are a plurality of user prohibited functions in the target function changing process, the target function changer 15 sets a plurality of user alternative functions respectively as the target functions instead of the plurality of user prohibited functions. In the case of setting the plurality of user alternative functions respectively as the target functions, the target function changer 15 sets the user alternative functions as the target functions first from the one having a largest number of first exclusive functions, which are user coexistence possible functions as the user alternative functions that can be set together with the user alternative function already set as the target function and other functions that cannot be set as the target functions together with this user coexistence possible function.

Similarly to this, when there are a plurality of initially prohibited functions in the initial function changing process, the initial function changer 19 sets the plurality of initial alternative functions respectively as the target functions instead of the plurality of initially prohibited functions. In the case of setting the plurality of initial alternative functions respectively as the target functions, the initial function changer 19 sets the initial alternative functions as the target functions first from the one having a largest number of second exclusive functions, which are initial coexistence possible functions that can be set as the target function together with the initial alternative function already set as the target function and other functions that cannot be set as the target functions together with the initial coexistence possible function.

The first and second exclusive functions can be grasped, using the setting pattern information stored in the setting pattern information storage 84 (FIG. 3) as described later.

FIG. 7 is a table showing an example of setting pattern information SP stored in the setting pattern information storage 84. For example, as shown in FIG. 7, the setting pattern information SP is in the form of a table in which a list of functions designated earlier are arranged along a vertical axis and the functions designated later are arranged along a horizontal axis and which show combinations of two mutually different functions when two mutually different functions are successively designated and combined as the functions to be executed by the control unit 10. A character string indicating which of the following first, second and third patterns P1, P2 and P3 the combination of two mutually different functions corresponding to each cell of the table is written in each cell.

The combination of the first pattern P1 is a combination in which only the function designated earlier should be set as the target function in the case of successively setting the two functions included in the combination as the target functions. In FIG. 7, each cell corresponding to the combination of the first pattern P1 is shown as a cell in which an underlined character string "P1" is written and which is hatched.

For example, in the setting pattern information SP shown in FIG. 7, a combination C1 of the black-and-white function as the function designated earlier and the color balance adjustment function as the function designated later is determined as the combination of the first pattern P1 since the color balance adjustment function cannot be set as the target function when the black-and-white function is first set as the target function and only the black-and-white function designated earlier should be set as the target function.

The combination of the second pattern P2 is a combination in which the two functions included in the combination should be both set as the target functions. In other words, the two functions included in the combination of the second pattern P2 can both operate independently of each other. In FIG. 7, each cell corresponding to the combination of the second pattern P2 is shown as a cell in which a character string "P2" is written.

For example, in the setting pattern information SP shown in FIG. 7, a combination C2 of the black-and-white function as the function designated earlier and the color balance adjustment off function as the function designated later is determined as the combination of the second pattern P2 since the color balance adjustment off function can be set as the target function when the black-and-white function is first set as the target function and both the black-and-white function and the color balance adjustment off function should be set as the target functions.

The combination of the third pattern P3 is a combination in which, out of the two functions included in the combination, the setting of the function designated earlier as the target function should be canceled and only the function designated later should be set as the target function. In FIG. 7, each cell corresponding to the combination of the third pattern P3 is shown as a cell in which an outlined character string "P3" is written in black background.

For example, in the setting pattern information SP shown in FIG. 7, a combination C3 of the black-and-white function as the function designated earlier and the color function as the function designated later is a combination of the alternative functions that are determined by the alternative function information EF (FIG. 4) and cannot be simultaneously set as the target functions. The combination C3 is determined as the combination of the third pattern P3 since the setting of the black-and-white function set first as the target function should be canceled in trying to set the color function as the target function after the black-and-white function is set first as the target function.

The combination of the third pattern P3 is not limited to the combination of the alternative functions determined by the alternative function information EF (FIG. 4). For example, in the setting pattern information SP shown in FIG. 7, a combination C4 of the color balance adjustment function designated earlier and the black-and-white function designated later is determined as the combination of the third pattern P3 since the setting of the color balance adjustment function set first as the target function should be canceled in trying to set the black-and-white function as the target function when the color balance adjustment function is set first as the target function.

For example, when the two functions of the color function and the aggregate off function are determined to be user prohibited functions in the case of performing the target function changing process, the target function changer 15 sets the two functions of the black-and-white function and the 2-in-1 aggregate function alternative to these two user prohibited functions as the user alternative functions, using the alternative function information EF (FIG. 4).

Here, the black-and-white function and the 2-in-1 aggregate function respectively belong to different function categories (FIG. 4), i.e. are not a combination of the alternative functions and can be simultaneously set as the target functions. Accordingly, assuming that the two user alternative functions of the black-and-white function and the 2-in-1 aggregate function are user coexistence possible functions, which are user alternative functions that can be simultaneously set as the target functions, the target function changer 15 successively sets these two user coexistence possible functions as the target functions.

At this time, the target function changer 15 grasps the numbers of the first exclusive functions respectively corresponding to the black-and-white function and the 2-in-1 aggregate function, using the combinations of the third pattern P3 determined by the setting pattern information SP.

Specifically, there are, for example, three combinations (combinations C4, C5 and C6) with the black-and-white function as a function AF1 designated later out of the combinations of the third pattern P3 in the setting pattern information SP shown in FIG. 7. That is, there are three functions (color balance adjustment function, hue adjustment function and color function) that are combined as the function designated before the black-and-white function due to these three combinations of the third pattern P3. The three functions (color balance adjustment function, hue adjustment function and color function) combined as the function designated earlier in these three combinations (combinations C4, C5 and C6) of the third pattern P3 are functions, the setting of which as the target function should be canceled when the black-and-white function is set as the target function. That is, these three functions designated earlier are first exclusive functions corresponding to the black-and-white function, which functions cannot be set as the target function together with the black-and-white function. Thus, the target function changer 15 grasps that three functions of the color balance adjustment function, the hue adjustment function and the color function that are combined as the function designated earlier in these three combinations C4, C5 and C6 of the third pattern P3 exist as the first exclusive functions corresponding to the black-and-white function.

Similarly to this, there are, for example, two combinations (combinations C7, C8) with the 2-in-1 aggregate function as a function AF2 designated later out of the combinations of the third pattern P3, i.e. there are two functions (aggregate off function, fixed magnification function) that are combined as the function designated before the 2-in-1 aggregate function due to these two combinations of the third pattern P3. That is, the two functions (aggregate off function, fixed magnification function) combined as the function designated earlier in these two combinations of the third pattern P3 are first exclusive functions corresponding to the 2-in-1 aggregate function, which functions cannot be set as the target function together with the 2-in-1 aggregate function. Thus, the target function changer 15 grasps that two functions of the aggregate off function and the fixed magnification function that are combined as the function designated earlier in these two combinations C7, C8 of the third pattern P3 exist as the first exclusive functions corresponding to the 2-in-1 aggregate function.

In this case, the target function changer 15 sets the two user coexistence possible functions of the black-and-white function and the 2-in-1 aggregate function as the target functions first from the black-and-white function having a larger number of first exclusive functions out of these two. Note that in setting this black-and-white function as the target function, the setting of the color balance adjustment function, the hue adjustment function and the color function as the target functions is canceled if the color balance adjustment function, the hue adjustment function and the color function that are the first exclusive functions corresponding to the black-and-white function are set first as the target functions. Here, to cancel the setting as the target function specifically means to delete the information such as the function name for identifying this target function stored in the RAM.

Subsequently, the target function changer 15 sets the 2-in-1 aggregate function as the target function. In setting this, the setting of the aggregate off function and the fixed magnification function as the target functions is canceled if the aggregate off function and the fixed magnification function that are the first exclusive functions corresponding to the 2-in-1 aggregate function are set first as the target functions.

Similarly to this, for example, when the two functions of the color function and the aggregate off function are initially prohibited functions in the case of performing the initial function changing process, the initial function changer 19 sets the two functions of the black-and-white function and the 2-in-1 aggregate function alternative to these two initially prohibited functions as the initial alternative functions.

These two initial alternative functions are not a combination of mutually alternative functions and can be simultaneously set as the target functions. Thus, assuming that the two initial alternative functions of the black-and-white function and the 2-in-1 aggregate function are both initial coexistence possible functions, which are initial alternative functions that can be simultaneously set as the target functions, the initial function changer 19 successively sets these two initial coexistence possible functions as the target functions.

Here, the initial function changer 19 grasps the numbers of the second exclusive functions respectively corresponding to the black-and-white function and the 2-in-1 aggregate function, using the combinations of the third pattern P3 determined by the setting pattern information SP.

Specifically, there are, for example, three combinations (combinations C4, C5 and C6) with the black-and-white function as the function AF1 designated later out of the combinations of the third pattern P3 in the setting pattern information SP shown in FIG. 7. That is, there are three functions (color balance adjustment function, hue adjustment function and color function) that are combined as the function designated before the black-and-white function due to these three combinations of the third pattern P3. The three functions (color balance adjustment function, hue adjustment function and color function) combined as the function designated earlier in these three combinations (combinations C4, C5 and C6) of the third pattern P3 are functions, the setting of which as the target function should be canceled, when the black-and-white function is set as the target function. That is, these three functions designated earlier are second exclusive functions corresponding to the black-and-white function, which functions cannot be set as the target function together with the black-and-white function. Thus, the initial function changer 19 grasps that three functions of the color balance adjustment function, the hue adjustment function and the color function that are combined as the function designated earlier in these three combinations C4, C5 and C6 of the third pattern P3 exist as the second exclusive functions corresponding to the black-and-white function.

Similarly to this, there are, for example, two combinations (combinations C7, C8) with the 2-in-1 aggregate function as the function AF2 designated later out of the combinations of the third pattern P3, i.e. there are two functions (aggregate off function, fixed magnification function) that are combined as the function designated before the 2-in-1 aggregate function due to these two combinations of the third pattern P3. That is, the two functions (aggregate off function, fixed magnification function) combined as the function designated earlier in these two combinations of the third pattern P3 are second exclusive functions corresponding to the 2-in-1 aggregate function, which functions cannot be set as the target function together with the 2-in-1 aggregate function. Thus, the initial function changer 19 grasps that two functions of the aggregate off function and the fixed magnification function that are combined as the function designated earlier in these two combinations C7, C8 of the third pattern P3 exist as the second exclusive functions corresponding to the 2-in-1 aggregate function.

In this case, the initial function changer 19 sets the two initial coexistence possible functions of the black-and-white function and the 2-in-1 aggregate function as the target functions first from the black-and-white function having a larger number of second exclusive functions out of these two. Note that in setting this black-and-white function as the target function, the setting of the color balance adjustment function, the hue adjustment function and the color function as the target functions is canceled if the color balance adjustment function, the hue adjustment function and the color function that are the second exclusive functions corresponding to the black-and-white function are set first as the target functions.

Subsequently, the initial function changer 19 sets the 2-in-1 aggregate function as the target function. In setting this, the setting of the aggregate off function and the fixed magnification function as the target functions is canceled if the aggregate off function and the fixed magnification function that are the second exclusive functions corresponding to the 2-in-1 aggregate function are set first as the target functions.

Figure 9:
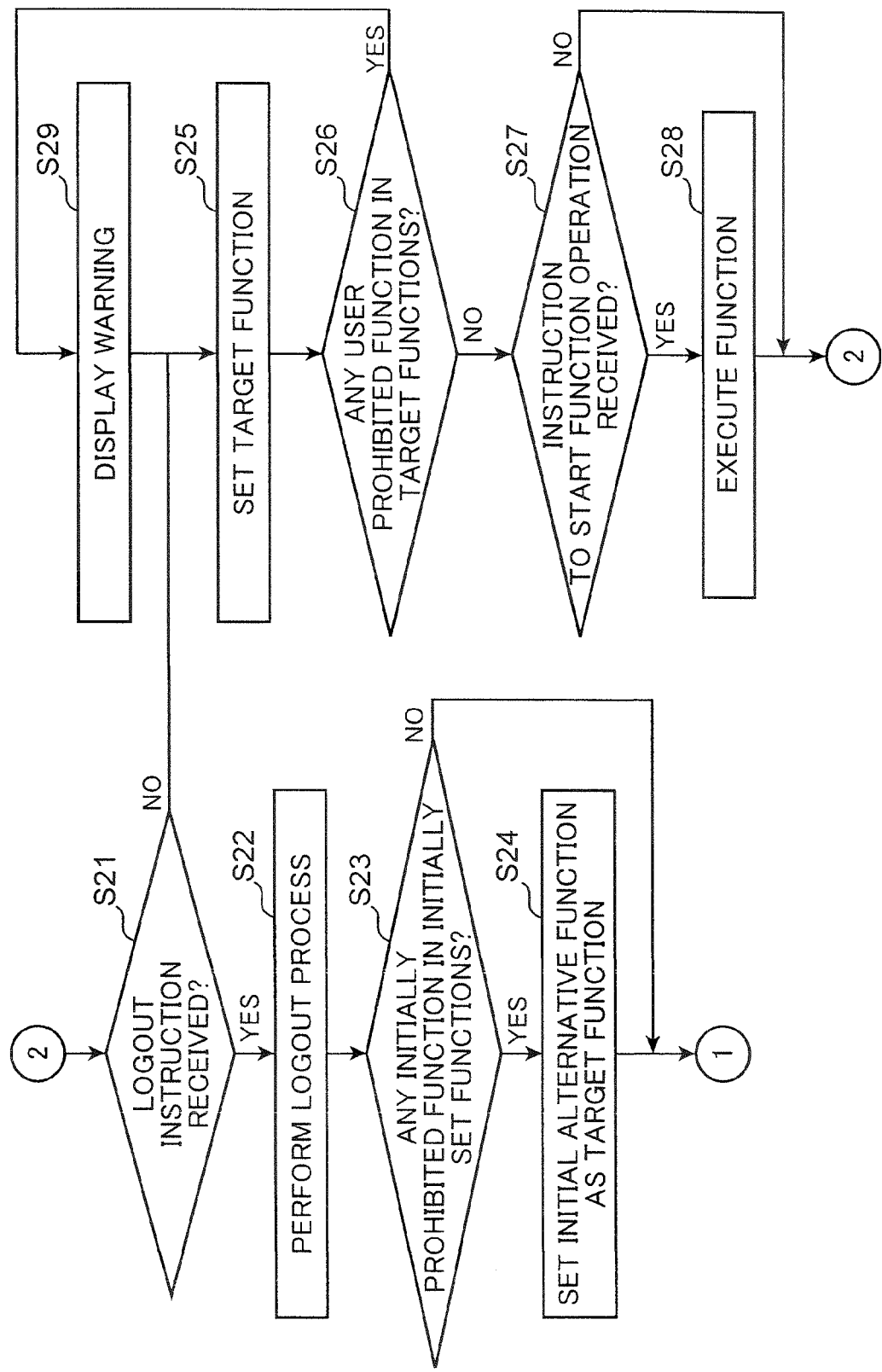
FIG. 9 is a flow chart showing the operation of the initial function changing process.

Next, the operations of the target function changing process and the initial function changing process are described using FIGS. 8 and 9. FIG. 8 is a flowchart showing the operation of the target function changing process. FIG. 9 is a flowchart showing the operation of the initial function changing process.

If the function to be executed by the control unit 10 is designated by the user such as through an operation of touching a soft key in an operation screen displayed on the liquid crystal display P when the multifunction peripheral 1 is powered on and in the initial state, the target function setter 13 receives the designation of this function and sets the received function as the target function (S1), for example, as shown in FIG. 8.

Then, the automatic login controller 14 determines whether or not the target function set in Step S1 is an initially authorized function using the initial authorization information DF (FIG. 4) stored in the authorization information storage 83 (S2).

When determining in Step S2 that the target function set in Step S1 is an initially authorized function (S2; YES), the automatic login controller 14 proceeds to Step S3 to execute the function set as the target function. The control unit 10 repeatedly returns to Step S1 unless the start key 75 (FIG. 2) is depressed, i.e. until an instruction to start the operation of the function is received (S3; NO). When the start key 75 (FIG. 2) is depressed and the instruction to start the operation of the function is received (S3; YES), the control unit 10 executes the function set as the target function (S4). Thereafter, the processings in and after Step S1 are repeated.

On the other hand, when determining in Step S2 that the target function set in Step S1 is a function different from the initially authorized function (S2; NO), the automatic login controller 14 causes the liquid crystal display P to display the login screen (S5).

When the cancel button K7, for example, as shown in FIG. 5B is depressed and the input of the login information is not received by the login information receiver 11 or when the login information received by the login information receiver 11 is determined not to match the login information stored in the login information storage 81 by the login authenticator 12 (S6; NO), the control unit 10 performs Step S7. In Step S7, the control unit 10 displays a warning such as through the display of a message, to the effect that the function set as the target function in Step S1 cannot be executed by the user when the multifunction peripheral 1 is in the initial state, on the liquid crystal display P (S7). Thereafter, the processings in and after Step S1 are repeated.

On the other hand, when the login information is received by the login information receiver 11 and this received login information is determined to match the login information stored in the login information storage 81 by the login authenticator 12 (S6; YES), the authenticated user corresponding to this login information is set in the login state, wherefore the target function changer 15 starts the execution of the target function changing process in response to this.

When starting the execution of the target function changing process, the target function changer 15 first determines whether or not there is any user prohibited function, which is a function different from the user authorized function corresponding to the authenticated user in the login state in Step S6, out of the target functions set by the target function setter 13, using the user authorization information UF (FIG. 4) stored in the authorization information storage 83 (S8).

When determining in Step S8 that any user prohibited function is included (S8; YES), the target function changer 15 sets the user alternative function, which is the function matching the user authorized function corresponding to the authenticated user set in the login state in Step S6, as the target function out of the functions alternative to this user prohibited function instead of the user prohibited function, using the alternative function information EF (FIG. 4) stored in the alternative function information storage 82 and finishes the execution of the target function changing process (S9). On the other hand, when determining in Step S8 that no user prohibited function is included (S8; NO), the target function changer 15 finishes the execution of the target function changing process.

Subsequently, when a logout instruction is received by the logout instruction receiver 17, for example, through the depression of the logout instruction button 74e by the user (S21; YES), the logout processor 18 performs the logout process, causes the all-reset processor 16 to perform the all-reset process and cancels the login state to change the state of the multifunction peripheral 1 to the initial state (S22), for example, as shown in FIG. 9.

When the logout process is performed (S22), the initial function changer 19 starts the execution of the initial function changing process and determines whether or not there is any initially prohibited function, which is a function different from the initially authorized function, out of the initially set functions set as the target functions by the all-reset process in Step S22, using the initial authorization information DF (FIG. 4) stored in the authorization information storage 83 (S23).

When determining in Step S23 that any initially prohibited function is included (S23; YES), the initial function changer 19 sets an initial alternative function, which is a function matching the initially authorized function, as the target function out of the functions alternative to this initially prohibited function instead of this initially prohibited function, using the alternative function information EF (FIG. 4) stored in the alternative function information storage 82 and finishes the execution of the initial function changing process (S24). On the other hand, when determining in step S23 that no initially prohibited function is included (S23; NO), the initial function changer 19 finishes the execution of the initial function changing process. In this way, the multifunction peripheral 1 returns to the initial state where there is no authenticated user set in the login state, wherefore the processings in and after Step S1 are repeated.

On the other hand, if the function designated by the user is set as the target function by the target function setter 13 (S25) when no logout instruction is received by the logout instruction receiver 17 (S21; NO), the control unit 10 determines whether or not the target function set in Step S25 is a user prohibited function, which is a function different from the user authorized function corresponding to the authenticated user in the login state, using the user authorization information UF (FIG. 4) stored in the authorization information storage 83 (S26).

When determining in Step S26 that the target function set in the Step S25 is a user prohibited function (S26; YES), the control unit 10 displays a warning such as through the display of a message, to the effect that the function set as the target function in Step S25 is a function that cannot be executed by the authenticated user in the login state, on the liquid crystal display P (S29). Thereafter, the processings in and after Step S25 are repeated.

On the other hand, when determining in Step S26 that the target function set in the Step S25 is not a user prohibited function (S26; NO), the processings in and after Step S21 are repeated unless the start key 75 (FIG. 2) is depressed, i.e. until the instruction to start the operation of the function is received (S27; NO). When the instruction to start the operation of the function is received through the depression of the start key 75 (FIG. 2) (S27; YES), the control unit 10 executes the functions set as the target functions (S28). Thereafter, the processings in and after Step S21 are repeated.

As just described, according to the above embodiment, when the authenticated user is set in the login state, the user alternative function is automatically set as the target function instead of the user prohibited function. Thus, the trouble to set the user alternative function as the target function can be reduced as compared with the case where the authenticated user manually designates the user alternative function to set the user alternative function alternative to the user prohibited function as the target function instead of the user prohibited function when the authenticated user is set in the login state.

Further, according to the above embodiment, when the logout process is performed, the initially set functions are set as the target functions instead of all the functions set as the target functions by the authenticated user and the state of the multifunction peripheral 1 is changed to the initial state. Then, the initial function changer 19 sets the initial alternative function as the target function instead of the initially prohibited function different from the initially authorized function out of the initially set functions set as the target functions. Thus, the trouble to set the initial alternative function as the target function can be reduced as compared with the case where the user manually designates the initial alternative function to set the initial alternative function alternative to the initially prohibited function as the target function instead of the initially prohibited function when the multifunction peripheral 1 is set in the initial state.

Further, according to the above embodiment, if there are a plurality of user prohibited functions when the authenticated user is set in the login state, the user alternative functions are set as the target functions first from the one having a largest number of first exclusive functions, which are user coexistence possible functions as the user alternative functions that can be set together with the user alternative function already set as the target function and are other functions that cannot be set together with the user coexistence possible function, in setting a plurality of user alternative functions as the target functions instead of the plurality of user prohibited functions.

Accordingly, the user alternative function set as the target function later has a smaller number of other functions that cannot be simultaneously set. This can reduce a probability that the setting of the user alternative function set earlier as the target function is canceled by setting another user alternative function as the target function later and a plurality of user alternative functions can be efficiently set as the target functions.

Further, according to the above embodiment, if there are a plurality of initially prohibited functions when the multifunction peripheral 1 is set in the initial state, the initial alternative functions are set as the target functions first from the one having a largest number of second exclusive functions, which are initial coexistence possible functions as the initial alternative functions that can be set together with the initial alternative function already set as the target function and are other functions that cannot be set together with the initial coexistence possible functions, in setting a plurality of initial alternative functions as the target functions instead of the plurality of initially prohibited functions.

Accordingly, the initial alternative function set as the target function later has a smaller number of other functions that cannot be simultaneously set. This can reduce a probability that the setting of the initial alternative function set earlier as the target function is canceled by setting another initial alternative function as the target function later and a plurality of initial alternative functions can be efficiently set as the target functions.

Further, according to the above embodiment, in successively setting a plurality of user coexistence possible functions as the target functions, the user coexistence possible functions are set as the target functions first from the one having a largest number of functions that are combined as the function designated before the user coexistence possible function to be set due to the combinations of the third patterns P3 (FIG. 7). Further, every time the user coexistence possible function is set as the target function, the setting of the earlier target function is canceled if the function combined as the function designated before the user coexistence possible function to be set due to the combination of the third pattern P3 is set as the target function.

Accordingly, the user coexistence possible function set as the target function later has a larger number of functions, the setting of which as the target function is already canceled. Thus, there is a low possibility that the first exclusive functions corresponding to the user coexistence possible function to be set are set as the target functions. This can reduce a chance of performing a process for canceling the setting as the target function that should not be set earlier as the target function due to a relationship with the user coexistence possible function to be set.

Furthermore, according to the above embodiment, in successively setting a plurality of initial coexistence possible functions as the target functions, the initial coexistence possible functions are set as the target functions first from the one having a largest number of functions that are combined as the function designated before the initial coexistence possible function to be set due to the combinations of the third patterns P3 (FIG. 7). Further, every time the initial coexistence possible function is set as the target function, the setting of the earlier target function is canceled if the function combined as the function designated before the initial coexistence possible function to be set due to the combination of the third pattern P3 is set as the target function.

Accordingly, the initial coexistence possible function set as the target function later has a larger number of functions, the setting of which as the target function is already canceled. Thus, there is a low possibility that the second exclusive functions corresponding to the initial coexistence possible function to be set are set as the target functions. This can reduce a chance of performing a process for canceling the setting as the target function that should not be set earlier as the target function due to a relationship with the initial coexistence possible function to be set.

Further, according to the above embodiment, the input of the login information to the login information receiver 11 is automatically guided when the set target function is different from the initially authorized function. Thus, when the set target function is different from the initially authorized function, the login information can be quickly input as compared with the case where the user having noticed this difference manually inputs the login information to the login information receiver 11.

Thus, for example, the login information corresponding to the authenticated user, to whom the function set as the target function is related as the user authorized function, can be quickly input in accordance with this guidance and this function set as the target function can be executed by the control unit 10.

Note that, in the above embodiment, the image forming apparatus according to the present disclosure is described, taking the multifunction peripheral 1 as an example. The present disclosure can also be applied to a printer, a copier, a scanner device or the like. Further, the configurations and the processes shown in FIGS. 1 to 9 are merely illustrations of the embodiment according to the present disclosure and not intended to limit the present disclosure to the above embodiment.

For example, the configuration may be so simplified as not to include the automatic login controller 14. In accordance with this, after the execution of Step S1, the control unit 10 may determine whether or not the target function set in Step S1 (FIG. 8) is an initially prohibited function which is a function different from the initially authorized function, using the initial authorization information DF (FIG. 4) stored in the authorization information storage 83 as in Step S26 (FIG. 9) instead of Step S2 (FIG. 8). When the target function is determined to be the initially prohibited function in this determination, the control unit 10 may display a warning such as through the display of a message, to the effect that the function set as the target function in Step S1 is a function that cannot be executed by the user not in the login state, on the liquid crystal display P as in Step S29 (FIG. 9). Further, the processings in and after Step S5 (FIG. 8) may be executed when the login instruction button 74d is depressed.

Further, the configuration may be so simplified as not to include the setting pattern information storage 84. In accordance with this, the target function changer 15 may simplify the target function changing process so that, in setting a plurality of user alternative functions respectively as the target functions instead of a plurality of user prohibited functions when there are a plurality of user prohibited functions, the user alternative functions are set as the target functions first from the one having a predetermined highest priority. Similarly to this, the initial function changer 19 may simplify the initial function changing process so that, in setting a plurality of initial alternative functions respectively as the target functions instead of a plurality of initially prohibited functions when there are a plurality of initially prohibited functions, the initial alternative functions are set as the target functions first from the one having a predetermined highest priority. Note that the predetermined priority may be appropriately determined, for example, by the alphabetical order of the name of the function, the execution frequency of the function or the like.

Further, the configuration may be so simplified as not to include the all-reset processor 16, the logout instruction receiver 17, the logout processor 18 and the initial function changer 19. In accordance with this, the process may be so simplified as not to perform Steps S21 to S24.

Further, although the first exclusive functions corresponding to the user coexistence possible function are the functions that are combined as the function designated earlier in the combinations of the third pattern P3 of the setting pattern information SP (FIG. 7), they may further include the functions that are combined as the function designated earlier in the combinations of the first pattern P1 of the setting pattern information SP (FIG. 7). However, in this case, the target function changer 15 is so configured as not to cancel the setting of the first exclusive functions corresponding to the user coexistence possible function to be set as the target functions even if the first exclusive functions corresponding to the user coexistence possible function to be set are set as the target functions every time the user coexistence possible function is set as the target function.

Similarly to this, although the second exclusive functions corresponding to the initial coexistence possible function are the functions that are combined as the function designated earlier in the combinations of the third pattern P3 of the setting pattern information SP (FIG. 7), they may further include the functions that are combined as the function designated earlier in the combinations of the second pattern P1 of the setting pattern information SP (FIG. 7). However, in this case, the initial function changer 19 is so configured as not to cancel the setting of the second exclusive functions corresponding to the initial coexistence possible function to be set as the target functions even if the second exclusive functions corresponding to the initial coexistence possible function to be set are set as the target functions every time the initial coexistence possible function is set as the target function.

As described above, according to the present disclosure, when a certain user is authenticated in the initial state where there is no authenticated user, the trouble for the user to change the setting of the functions can be reduced if the functions executable in the initial state are functions not permitted to be executed by this authenticated user.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image forming apparatus comprising:
a control unit capable of executing a plurality of functions;
a login information storage for storing a plurality of pieces of login information for authenticating each of a plurality of authenticated users permitted in advance to use the image forming apparatus;
a login information receiver for receiving input of login information;
a login authenticator for setting an authenticated user corresponding to the login information in a login state when the login information received by the login information receiver matches login information stored in the login information storage;
a target function setter for receiving functions designated by a user as functions to be executed by the control unit out of the plurality of functions and setting received functions as target functions;
an authorization information storage for storing in advance initial authorization information indicating initially authorized functions permitted to be executed by a user when the image forming apparatus is in an initial state where there is no authenticated user set in the login state and user authorization information relating user authorized functions permitted to be executed by each authenticated user to each authenticated user;
an alternative function information storage for storing in advance alternative function information determining combinations of mutually alternative functions out of the plurality of functions;
a target function changer for performing a target function changing process when the authenticated user is set in the login state by the login authenticator, the target function changer, in the target function changing process, changing one or more user prohibited functions that are included in the target functions set by the target function setter and are different from user authorized functions relating to the authenticated user set in the login state by the user authorization information respectively to one or more user alternative functions that are determined as functions alternative to the respective user prohibited functions by the alternative function information and match the user authorized functions related to the authenticated user set in the login state by the user authorization information; and
a setting pattern information storage for storing in advance setting pattern information which, for each combination included in a plurality of combinations formed when two mutually different functions are designated successively and combined as functions to be executed by the control unit out of the plurality of functions, determines whether each of the combinations is of a first pattern in which only a function designated earlier is supposed to be set as one of the target functions, of a second pattern in which two functions are both supposed to be set as the target functions or of a third pattern in which only a function designated later is supposed to be set as the target function after the setting of a function designated earlier as one of the target functions is canceled;

wherein:
in changing a plurality of user prohibited functions respectively to a plurality of user alternative functions when there are the plurality of user prohibited functions in the target function changing process, the target function changer changes the plurality of user prohibited functions to the user alternative functions first from the one having a largest number of first exclusive functions, which are user coexistence possible functions as the user alternative functions that are settable together with the user alternative functions already set as the target functions and other functions that are not settable together with the user coexistence possible functions;
each of the first exclusive functions is a function combined as the function designated earlier with the user coexistence possible functions by the combination of the third pattern; and
the target function changer further cancels a setting as the target functions of each of the first exclusive functions corresponding to each of the user coexistence possible functions if each of the first exclusive functions corresponding to each of the user coexistence possible functions is set as one of the target functions every time each of the user prohibited functions is changed to each of the user coexistence possible functions.

2. An image forming apparatus according to claim 1, further comprising:
an automatic login controller for guiding the input of the login information to the login information receiver if the set target function is different from the initially authorized function when the target function is set by the target function setter in the case where the image forming apparatus is in the initial state.

3. An image forming apparatus comprising:
a control unit capable of executing a plurality of functions;
a login information storage for storing a plurality of pieces of login information for authenticating each of a plurality of authenticated users permitted in advance to use the image forming apparatus;
a login information receiver for receiving input of login information;
a login authenticator for setting an authenticated user corresponding to the login information in a login state when the login information received by the login information receiver matches login information stored in the login information storage;
a target function setter for receiving functions designated by a user as functions to be executed by the control unit out of the plurality of functions and setting received functions as target functions;
an authorization information storage for storing in advance initial authorization information indicating initially authorized functions permitted to be executed by a user when the image forming apparatus is in an initial state where there is no authenticated user set in the login state and user authorization information relating user authorized functions permitted to be executed by each authenticated user to each authenticated user;
an alternative function information storage for storing in advance alternative function information determining combinations of mutually alternative functions out of the plurality of functions;
a target function changer for performing a target function changing process when the authenticated user is set in the login state by the login authenticator, the target function changer, in the target function changing process, changing one or more user prohibited functions that are included in the target functions set by the target function setter and are different from user authorized functions relating to the authenticated user set in the login state by the user authorization information respectively to one or more user alternative functions that are determined as functions alternative to the respective user prohibited functions by the alternative function information and match the user authorized functions related to the authenticated user set in the login state by the user authorization information;

an all-reset processor for performing an all-reset process for setting one or more predetermined initially set functions as the target functions instead of all the functions set as the target functions;

a logout instruction receiver for receiving a logout instruction for changing the state of the image forming apparatus to the initial state;

a logout processor for performing a logout process when the logout instruction is received by the logout instruction receiver when any of the authenticated users is in the login state, the logout processor, in the logout process, changing the state of the image forming apparatus to the initial state by causing the all-reset processor to perform the all-reset process and cancels the login state and changes the state of the image forming apparatus to the initial state; and an initial function changer for performing an initial function changing process when the logout process is performed by the logout processor, the initial function changer, in the initial function changing process, changing one or more initially prohibited functions that are included in the initially set functions set as the target functions by the all-reset process and are different from the initially authorized functions respectively to one or more initial alternative functions that are determined as functions alternative to the respective initially prohibited functions by the alternative function information and match the initially authorized functions; and a setting pattern information storage for storing in advance setting pattern information which, for each combination included in a plurality of combinations formed when two mutually different functions are designated successively and combined as functions to be executed by the control unit out of the plurality of functions, determines whether each of the combinations is of a first pattern in which only a function designated earlier is supposed to be set as one of the target functions, of a second pattern in which two functions are both supposed to be set as the target functions or of a third pattern in which only a function designated later is supposed to be set as one of the target functions after the setting of a function designated earlier as one of the target functions is canceled and;

wherein:

in changing a plurality of user prohibited functions respectively to a plurality of user alternative functions when there are the plurality of user prohibited functions in the target function changing process, the target function changer changes the plurality of user prohibited functions to the user alternative functions first from the one having a largest number of first exclusive functions, which are user coexistence possible functions as the user alternative functions that are settable together with the user alternative functions already set as the target functions and other functions that are not settable together with the user coexistence possible functions, in changing a plurality of initial prohibited functions respectively to a plurality of initial alternative functions when there are the plurality of initial prohibited functions in the initial function changing process, the initial function changer changes the plurality of initial prohibited functions to the initial alternative functions first from the one having a largest number of second exclusive functions, which are initial coexistence possible functions as the initial alternative functions that are settable together with the initial alternative functions already set as the target functions and other functions that are not settable together with the initial coexistence possible functions, each of the first exclusive functions is a function combined as the function designated earlier with the user coexistence possible functions by the combination of the third pattern;

the target function changer further cancels a setting as the target functions of each of the first exclusive functions corresponding to each of the user coexistence possible functions if each of the first exclusive functions corresponding to each of the user coexistence possible functions is set as one of the target functions every time each of user prohibited functions is changed to each of the user coexistence possible functions;

each of the second exclusive functions is a function combined as the function designated earlier with the initial coexistence possible functions by the combination of the third pattern; and the initial function changer further cancels a setting as the target functions of each of the second exclusive functions corresponding to each of the initial coexistence possible functions if each of the second exclusive functions corresponding to each of the initial coexistence possible functions is set as one of the target functions every time each of initially prohibited functions is changed to each of the initial coexistence possible functions.

4. An image forming apparatus according to claim 3, further comprising:

an automatic login controller for guiding the input of the login information to the login information receiver if the set target function is different from the initially authorized function when the target function is set by the target function setter in the case where the image forming apparatus is in the initial state.

* * * * *